United States Patent
Wang et al.

(10) Patent No.: US 6,454,916 B1
(45) Date of Patent: Sep. 24, 2002

(54) SELECTIVE ELECTROPLATING WITH DIRECT CONTACT CHEMICAL POLISHING

(75) Inventors: Fei Wang, San Jose, CA (US); Steven C. Avanzino, Cupertino, CA (US); Darrell M. Erb, Los Altos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/477,810

(22) Filed: Jan. 5, 2000

(51) Int. Cl.$^7$ ................................................ C25D 17/00
(52) U.S. Cl. .................................. 204/224 R; 204/212
(58) Field of Search ...................... 437/225; 204/224 R, 204/212

(56) References Cited

U.S. PATENT DOCUMENTS

| | | | |
|---|---|---|---|
| 4,789,648 A | | 12/1988 | Chow et al. ................ 437/225 |
| 4,921,583 A | * | 5/1990 | Sewell et al. ................. 204/15 |
| 5,674,787 A | | 10/1997 | Zhao et al. ................. 437/230 |
| 6,027,630 A | * | 2/2000 | Cohen ........................ 205/135 |
| 6,027,631 A | * | 2/2000 | Broadbent .................. 205/137 |
| 6,099,712 A | * | 8/2000 | Ritzdorf et al. ............. 205/123 |
| 6,174,425 B1 | * | 1/2001 | Simpson et al. .............. 205/96 |
| 6,254,742 B1 | * | 7/2001 | Hanson et al. .............. 204/279 |
| 6,261,426 B1 | * | 7/2001 | Uzoh et al. ............. 204/224 R |

* cited by examiner

Primary Examiner—Donald R. Valentine
Assistant Examiner—Erica Smith-Hicks

(57) ABSTRACT

A deposition tool and a method for depositing a material within the recesses in a substrate of semiconductor wafer employs a rotatable diffuser that diffuses the plating material onto the top surface of a substrate. The diffuser is placed into contact with the semiconductor wafer and rotated while the plating material is applied through apertures in the diffuser. The plating material fills recesses patterned into the substrate of the semiconductor wafer but is prevented from forming to a significant degree on the top surface of the semiconductor wafer due to the contact and rotation of the diffuser. Since the plating material is not deposited on the top surface of the semiconductor wafer to any significant degree, chemical mechanical polishing (CMP) planarization is significantly reduced or completely eliminated.

8 Claims, 3 Drawing Sheets

SELECTIVE ELECTROPLATING WITH DIRECT CONTACT CHEMICAL POLISHING

FIELD OF THE INVENTION

The present invention relates to a method and apparatus for electroless plating and electroplating metal on a substrate comprising a seed layer. The present invention is applicable to plating copper or a copper alloy on a semiconductor substrate, particularly in forming integrated circuits having submicron design features.

BACKGROUND ART

The escalating requirement for high density and performance associated with ultra large scale integration (ULSI) semiconductor wiring require responsive changes in interconnection technology, which is considered one of the most demanding aspects of ULSI. Such escalating requirements have been found difficult to satisfy in terms of providing a low RC (resistance capacitance) interconnect pattern, particularly wherein submicron vias, contacts and trenches have high aspect ratios due to miniaturization.

Conventional semiconductor devices comprise a semiconductor substrate, normally of monocrystalline silicon, and a plurality of sequentially formed dielectric layers and conductive patterns. An integrated circuit is formed containing a plurality of conductive patterns comprising conductive lines, a plurality of interconnect lines, such as bus lines, bit lines, word lines and logic interconnect lines. Typically, the conductive patterns on different layers, i.e., upper and lower layers, are electrically connected by a conductive plug filling a via opening, while a conductive plug filling a contact opening establishes electrical contact with an active region on a semiconductor substrate, such as a source/drain region. Conductive lines typically extend substantially horizontal with respect to the semiconductor substrate. Semiconductor "chips" comprising three and four levels of metallization are becoming more prevalent as device geometries shrink to submicron levels.

High performance microprocessor applications require rapid speed of semiconductor circuitry. The control speed of semiconductor circuitry varies inversely with the resistance and capacitance of interconnection pattern. As integrated circuits become more complex and feature sizes and spacings become smaller, the integrated circuit speed becomes less dependent upon the transistor itself and more dependent upon the interconnection pattern. Thus, the interconnection pattern limits the speed of the integrated circuit.

In ULSI structures, high circuit speeds, high packing density and low powered dissipation are required. Consequently, feature sizes must be scaled down. The interconnect related time delays become the major limitation in achieving high circuit speeds. Shrinking device size automatically miniaturizes the interconnect feature size which increases interconnect resistance and interconnect current densities. Poor step coverage of metal and submicron high aspect ratio via holes also increases interconnect resistance and electromigration failures. If the interconnection node is routed over a considerable distance, e.g., hundreds of microns or more, as in submicron technologies, the interconnection capacitance limits the circuit node capacitance loading and, hence, the circuit speed. As integration density increases and feature size decreases in accordance with deep submicron design rules, the rejection rate due to integrated circuit speed delays approaches and even exceeds 20%.

One way to increase the control speed of semiconductor circuitry is to reduce the resistance of a conductive pattern.

Conventional metallization patterns are typically formed by depositing a layer of conductive material, notably aluminum (Al) or an alloy thereof, and etching, or by damascene techniques, wherein trenches are formed in dielectric layers and filled with a conductive material. Excess conductive material on the surface of the dielectric layer is then removed, as by chemical-mechanical polishing. Al is conventionally employed because it is relatively inexpensive, exhibits low resistivity and is relatively easy to etch. However, as the size of openings for vias/contacts and trenches is scaled down to the submicron range, step coverage problems have arisen involving the use of Al which has decreased the reliability of interconnections formed between different wiring layers. Such poor step coverage results in high current density and enhanced electromigration. Moreover, low dielectric constant polyamide materials, when employed as dielectric interlayers, create moisture/bias reliability problems when in contact with Al.

One approach to improved interconnection paths in vias comprises the use of completely filled plugs of a metal, such as tungsten (W). Accordingly, many current semiconductor devices utilizing very large scale integration (VLSI) technology employ Al for a wiring metal and W plugs for interconnections at different levels. However, the use of W is attendant with several disadvantages. For example, most W processes are complex and expensive. Moreover, W has a high resistivity. The Joule heating may enhance electromigration of adjacent Al wiring. Furthermore, W plugs are susceptible to void formation and the interface with the wiring layer usually results in high contact resistance.

Another attempted solution comprises the use of chemical vapor deposition (CVD) or physical vapor deposition (PVD) and elevated temperatures for Al deposition. The use of CVD for depositing Al has proven expensive, while PVD Al deposition requires very high process temperatures incompatible with manufacturing integrated circuitry.

Copper has recently received considerable attention as a replacement material for Al in VLSI interconnect metallization. Copper exhibits superior electromigration properties and has a lower resistivity than Al. In addition, copper has improved electrical properties vis-a-vis W, making copper a desirable metal for use as a conductive plug, as well as conductive wiring. For comparable performance characteristics, Al interconnect lines typically exhibit a current density limit of $2 \times 10^5$ amp/cm$^2$; whereas, a copper line would typically exhibit a current density limit of $5 \times 10^6$ amp/cm$^2$. Copper electromigration in interconnect lines has a high activation energy, i.e., up to twice as large as that of Al. Consequently, copper lines that are significantly thinner than Al lines can theoretically be employed, thereby reducing cross-talk and capacitance.

It is expected that a copper interconnect material leads to an improvement of one-half times in the maximum clock frequency of a complementary metal-oxide semiconductor (CMOS) chip vis-a-vis the Al-based interconnects for devices with effective channel ends of about 0.25 micrometers. Such favorable electrical characteristics of copper provide an incentive for developing copper films as interconnect layers in ULSI devices as well as top metal layers. However, there are also disadvantages attendant upon the use of copper. For example, copper metallization is very difficult to etch. Moreover, copper readily diffuses through silicon dioxide, a typical interlayer dielectric material employed in the manufacture of semiconductor devices, and adversely affects the devices.

One conventional approach in attempting to form copper plugs and wirings comprises the use of damascene structures employing chemical mechanical polishing, as in Chow et al., U.S. Pat. No. 4,789,648. However, due to copper diffusion through dielectric interlayer materials, such as silicon dioxide, copper interconnect structures must be encapsulated by a diffusion barrier layer. Typical diffusion barrier metals include tantalum (Ta), tantalum nitride (TaN), titanium nitride (TiN), titanium tungsten (TiW), tungsten nitride (WN) and silicon nitride ($Si_3N_4$) encapsulating copper. The use of such barrier metals to encapsulate copper is not limited to the interface between copper and the dielectric interlayer, but includes interfaces with other metals as well.

Electroless deposition has been suggested as a technique for forming interconnect structures. Electroless copper deposition is attractive due to low processing costs and high quality copper deposits. In addition, equipment for performing electroless deposition is relatively inexpensive vis-a-vis other semiconductor processing equipment for depositing metals. Electroless deposition also offers the advantageous opportunity for batch processing of wafers, thereby further reducing the cost of electroless deposition and increasing production throughput. However, electroless deposition requires a catalytic surface, i.e., seed layer, for the autocatalytic action to occur. It is difficult to obtain reliable and reproducible electroless copper deposition, since the seed layer surface must maintain catalytic activity for effective electroless deposition of copper.

After the copper has been deposited, either by electroless deposition or by electroplating, a relatively thick layer of copper is typically formed over the top surface of the substrate, such as the dielectric layer. Although the recesses, including trenches and via holes, are typically filled with the conductive material, (e.g., copper), the excess material needs to be removed from the top surface of the substrate prior to further processing of the wafer. A commonly used method of removing the excess copper material and planarizing the copper is known as chemical-mechanical polishing (CMP) planarization. In conventional CMP processing, a reactive agent in a slurry reacts with the surface of the layer to be polished, and the abrasive particles mechanically remove the reacted surface layer. The interaction of the polishing pad abrasive particles, and reactive agent with the layer to be polished results in a polishing. Typically, a wafer is held by a carrier head with the top surface of the wafer pressed face down against the outer surface of a polishing pad. A common two-layer polishing pad, with the upper layer composed of IC-1000 the lower layer composed of SUBA-4, is available from Rodell, Inc, located in Newark, Del. (IC-1000 and SUBA-4 are product names of Rodell, Inc.).

Removal of the excess conductive material, such as copper, by CMP requires the use of a CMP polisher, and reduces the throughput as a certain amount of time is required to remove the thickly deposited conductive layer.

SUMMARY OF THE INVENTION

There is a need for a deposition process for depositing a conductive material, such as copper, onto a substrate in a manner that does not require a significant amount of polishing and conductive layer removal.

This and other needs are met by embodiments of the present invention which provide a method of depositing a material by electrochemical plating within recesses in a substrate of a semiconductor. In the method, a diffuser is positioned above a top surface of a substrate of a semiconductor wafer so that the diffuser contact surface is in contact with the substrate top surface. The diffuser has apertures through which flows the material to be deposited within the recesses in the substrate. The diffuser is supplied with the material to be deposited. The diffuser is rotated with respect to the top surface of the substrate of the semiconductor wafer while the diffuser is in contact with the substrate top surface and the material to be deposited flows out of the apertures. In this manner, the material to be deposited flows from the apertures into the recesses. In certain preferred embodiments, the fluid supplied to the diffuser is a source of copper or copper alloy, which serves as the material to be deposited.

One of the advantages of the present invention is the avoidance of significant deposits on the top surface of the substrate due to keeping the diffuser in contact with the substrate top surface during the deposition of the material. The rotation of the diffuser, while maintaining contact between the diffuser and the substrate top surface, ensures that the apertures located on the diffuser contact surface will overlap the recesses in the substrate. Hence, only the recesses will fill with the conductive material, such as copper, and the contact prevents significant deposition on the substrate top surface. Hence, CMP planarization may be completely eliminated by the present invention for the purposes of removing excess conductive material on the top surface of the substrate, or at least substantially reduced.

In another aspect of the present invention, a deposition tool is provided having a wafer support with a support surface for supporting a wafer. The diffuser having a substantially planar contact surface and apertures open at the planar contact surface is provided. A material supply arrangement supplies the diffuser with the material which is to be deposited on the wafer through the apertures. A rotational arrangement rotates either the wafer support or the diffuser to provide relative rotation of the diffuser with respect to the wafer support. A vertical positioning arrangement vertically positions the diffuser and the wafer support with respect to one another such that the contact surface of the diffuser is selectively positionable against a wafer supported on the support surface.

One of the advantages of the deposition tool of the present invention is that the pressure against the wafer and the rotational speed of the diffuser are both controllable so as to allow for the control of the amount of conductive material deposited on the top surface of the substrate. The amount of material remaining on the top surface of the substrate is reduced with higher rotation speeds and higher pressures. Hence, the amount of material remaining on the top surface of the substrate is relatively controllable by the operator of a deposition tool.

The earlier stated needs are also met by another aspect of the present invention which provides a method of depositing copper containing conductive material in a recess of a substrate that has a top surface. The copper containing conductive material is supplied in a flowable form on the top surface of the substrate so that at least some of the copper containing conductive material flows into the recess. Simultaneously, the copper containing conductive material that does not flow into the recess is removed from the top surface of the substrate.

Additional objects and advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE DRAWINGS

The present invention addresses and solves problems related to the deposition of metal plating on the top surface of a substrate during deposition of the metal within recesses in the substrate. During the deposition process, the diffuser through which the plating solution is deposited onto the wafer is brought into direct contact with the wafer surface. In rotating the diffuser, the material to be deposited within the recesses is prevented from being deposited on the top surface of the substrate of the wafer by the physical contact of the diffuser with the wafer surface. At the same time, however, the rotating diffuser will allow the plating solution to enter the recesses, such as contact holes and trench lines, within the substrate of the wafer to deposit the conductive material in the recesses. By preventing the deposition of the conductive material on the top surface of the substrate, and allowing it to flow only into the recesses in the substrate, the need for CMP planarization and removal of the conductive layer from the top surface of the substrate is significantly reduced, if not completely eliminated.

Figure 1:
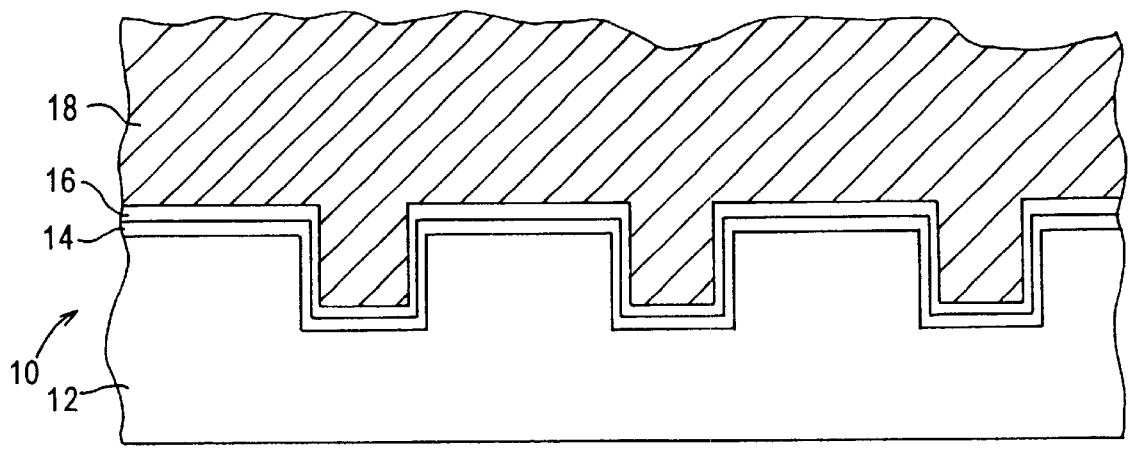
FIG. 1 is a schematic depiction of a cross-section of a portion of a semiconductor wafer following the deposition of a conductive layer on a substrate layer in accordance with methods of the prior art.
Figure 2:
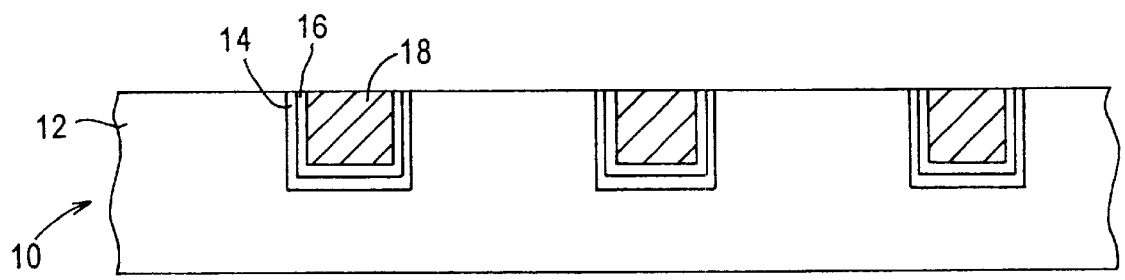
FIG. 2 is a schematic depiction of a cross-section of FIG. 1 following CMP planarization to remove the conductive layer above the top surface of the substrate, in accordance with the methods of the prior art.

FIG. 1 is a cross-section of a portion of a semiconductor wafer following deposition of a copper layer through known techniques. A semiconductor wafer 10 has a substrate layer 12, comprising a dielectric material, such as silicon dioxide, for example. Through known techniques, recesses are patterned into the substrate layer 12. A barrier layer 14 is formed on the substrate layer 12. The barrier layer 14 prevents diffusion of the subsequently deposited copper through the dielectric layer 12. An exemplary material for use in the barrier layer 14 is TiN. A seed layer 16 is then provided on the barrier layer 14. The copper layer is then deposited by either electroless deposition or electroplating to form a copper containing conductive layer 18. In typical methods, such as that depicted in FIG. 1, the copper containing conductive layer 18 is deposited to a thickness of approximately 10,000 Å. The bulk of the layer 18 needs to be removed from the top surface of the substrate 12, leaving the copper within the recesses in the substrate 12. This is accomplished, for example, by CMP planarization. The resulting structure after CMP planarization is depicted in FIG. 2. In order to perform this planarization, the wafer 10 is required to be removed from the deposition tool and placed in a CMP planarization tool where the wafer is polished until the thick copper layer 18 is removed.

Figure 3:
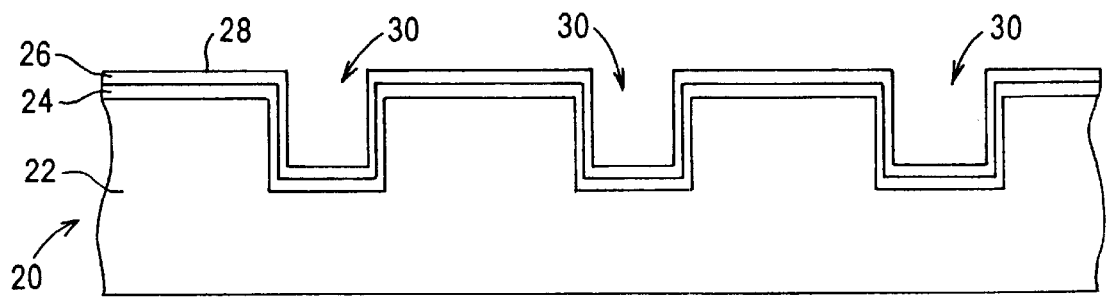
FIG. 3 is a schematic depiction of a cross-section of a substrate of a semiconductor wafer during the processing of the wafer in accordance with the embodiments of the present invention.

The present invention eliminates, or at least significantly reduces, the requirement for removing a substantial amount of a copper containing conductive layer by preventing the thick buildup of such a layer during the deposition process. FIG. 3 depicts a cross-section of a portion of a semiconductor wafer processed in accordance with embodiments of the present invention. The semiconductor wafer 20 has a substrate layer 22 made up of a dielectric material, for example, such as silicon dioxide. As in the prior art, a barrier layer 24 and a seed layer 26 are provided as part of the substrate layer 22. Recesses 30 are patterned in the substrate layer 22 prior to the formation of the barrier layer 24 and the seed layer 26. The substrate layer 22 has a top surface 28 that is substantially planar, but includes a recess 30.

Figure 4A:
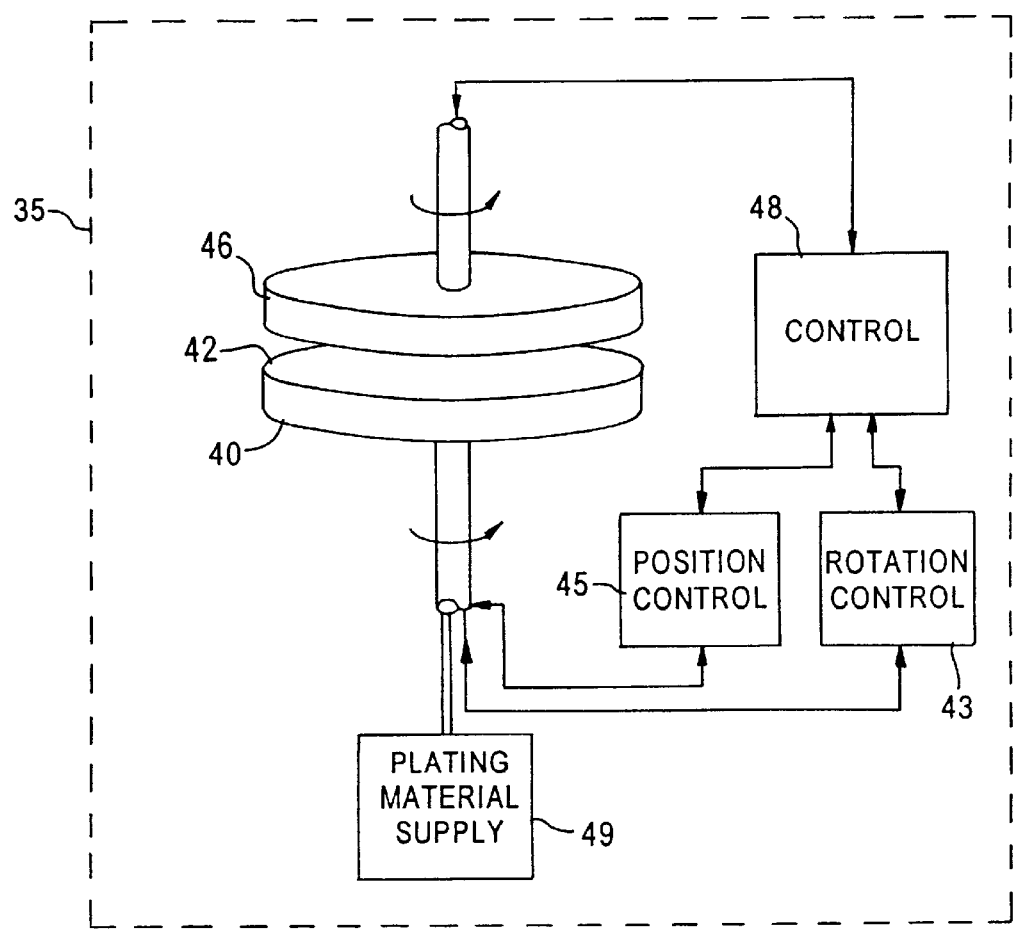
FIG. 4a is a schematic depiction of a portion of the deposition tool of the present invention.
Figure 4B:
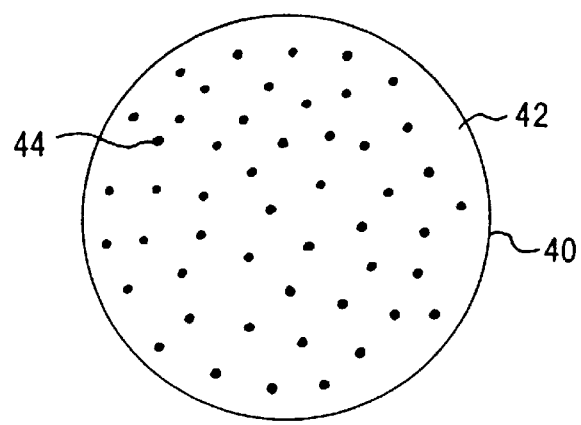
FIG. 4b is a bottom view of a diffuser.

In order to deposit the conductive material, such as copper, within the recesses 30, the wafer 20 is placed within a deposition tool 35 such as that schematically indicated in FIG. 4a. The deposition tool 35 includes a wafer support 46 on which the wafer 20 is chucked with the top surface 28 exposed. The deposition tool 35 has a diffuser 40 through which the plating solution is provided onto the wafer 20. In preferred embodiments of the present invention, the diffuser 40 is a rotatable diffuser. A top view of the diffuser 40 reveals a number of apertures 44 on a contact surface 42. Alternatively, the diffuser 40 may comprise a pad through which plating solution is diffused, instead of a spray configuration as depicted in FIG. 4b.

Plating material, such as copper sulfate ($CuSO_4$) is provided to the diffuser from a plating material supply source 49 through known fluid supply connections.

The diffuser 40 is rotatable relative to the wafer support 46 (and hence the wafer 20 supported by the wafer support 46) through a rotational mechanism 43. In the illustrated embodiment of FIG. 4a, the diffuser 40 is rotated. However, in other embodiments, the wafer support 46 is rotated while the diffuser 40 is held stationary. It is also possible for both the diffuser 40 and wafer support 46 to be rotated, as long as there is a relative rotation between the diffuser 40 and wafer support 46. Control device 48 is provided to control the speed of rotation provided by the rotation mechanism 43. The diffuser is rotated between about 1 and about 100 rpm in certain embodiments, and in especially preferred embodiments is rotated between about 5 and about 10 rpm with respect to the wafer support 46.

The diffuser 40 is selectively positioned against a wafer 20 supported by the wafer support 46 during the deposition of the plating material, in accordance with embodiments of the present invention. A positioning mechanism 45 adjusts the position of the diffuser 40 with respect to the wafer support 46. The position mechanism 45 is under the control of the control device 48 to adjust the pressure of the diffuser 40 against the wafer 20. In preferred embodiments of the present invention, the diffuser 40 contacts the substrate top surface 28 with a pressure of about between 1 and about 20 psi. In alternate embodiments, the wafer support 46 is movable instead of, or in addition to, the diffuser 40, to place the wafer 20 into contact with the bottom contact surface 42 of the diffuser 40.

Figure 5:
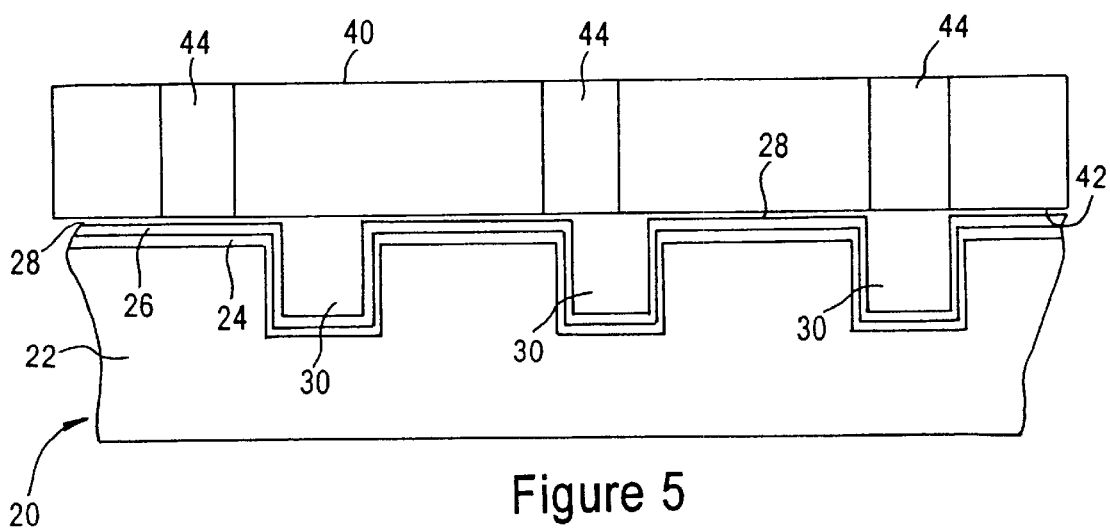
FIG. 5 is a cross-section of a portion of FIG. 3 during deposition of the conductive material within the recesses of the substrate in accordance with embodiments of the present invention.

FIG. 5 is a cross-section of the portion of the semiconductor wafer 20 of FIG. 3, following the positioning of the diffuser 40 against the wafer 20. The contact surface 42 of the diffuser 40 presses against the top surface 28 of the substrate 22 with a pressure between about 1 and about 20 psi, as set by the control means 48. During the deposition process, the diffuser 40 is rotated relative to the wafer 20, and at the same time, the diffuser 40 is in contact with the wafer 20. The pressure of contact and the relative rotational speed are both set by the control device 48.

During the rotation of the diffuser 40, the plating solution is supplied by the plating material supply 49 through the apertures 44. The plating solution flows through the apertures 44 into the recesses 30 when the apertures 44 completely or at least partially overlap the recesses 30. When the apertures 44 are over a top planar surface 28 of the substrate 22, the plating material does not substantially flow onto the top surface 28. The rotation of the diffuser 40 with respect to the wafer 20 assures that the apertures 44 will pass over the recesses 30 sufficiently to fill the recesses 30 with plating material. Material that does contact the top surface 28 is removed by the physical contact and rotational motion of the diffuser 40. Hence, the only significant deposition of the plating material on the wafer 20 is within the recesses 30.

Figure 6:
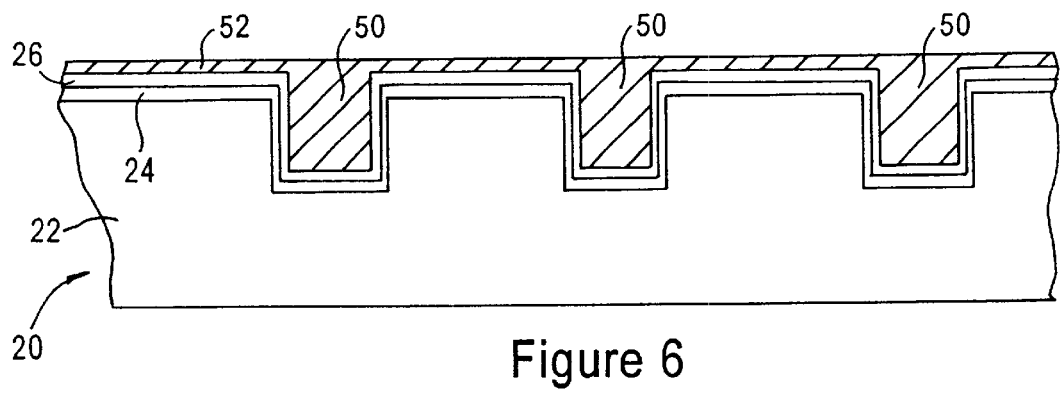
FIG. 6 is a schematic depiction of a cross-section of FIG. 5 following the deposition of the conductive material in accordance with the embodiments of the present invention.
Figure 7:
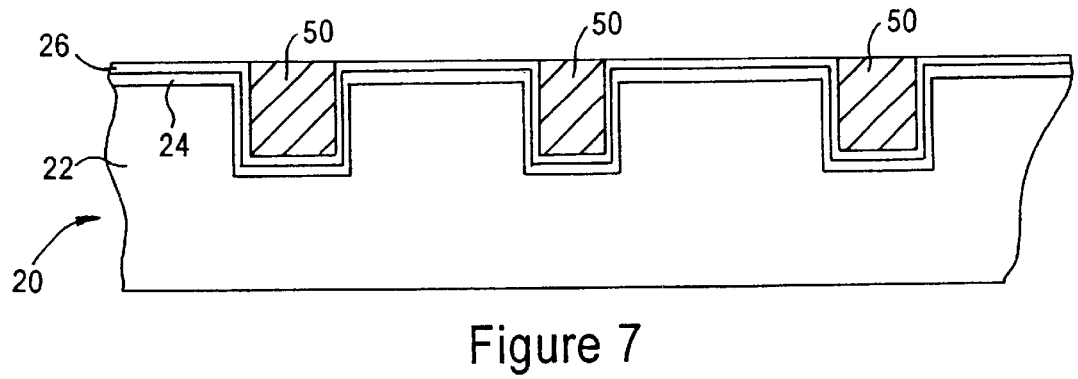
FIG. 7 is a schematic depiction of the cross-section of FIG. 6 after removal of any remaining deposited conductive material on the top surface of the substrate.

FIG. 6 depicts the semiconductor wafer 20 after the deposition process and before any planarization step is taken. The conductive material has formed features 50 within the recesses 30 of the substrate 20. Depending upon the pressure applied against the wafer 20 by the diffuser 40, a relatively thin layer 52 of conductive material may still remain on the top surface 28 of the substrate 22. A small amount of CMP planarization will remove this excess conductive layer 52. This results in the structure depicted in FIG. 7. However, in preferred embodiments of the present invention, the pressure and rotational speed is set such that the copper layer 52 is not formed on the top surface 28 of the substrate 22. Instead, only the features 50 are formed within the recesses 30 of the substrate, providing the structure depicted in FIG. 7 without the need for planarization and excess conductive material removal.

The rotation of the diffuser 40 with respect to the wafer 20 assures that the apertures 44 will pass over the recesses 30 sufficiently to fill the recesses 30 with plating material.

The present invention has the advantage of significantly reducing, or completely eliminating, the need for CMP planarization of a conductive layer by controlling the deposition of the conductive layer. Deposition of a thick layer is prevented by pressing a plating solution diffuser against the wafer and rotating the diffuser. Throughput is increased by elimination or significant reduction of CMP planarization to remove a thick conductive layer.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A deposition tool comprising:
   a wafer support having a support surface for supporting a wafer;
   a diffuser having a substantially planar contact surface and apertures that open at the planar contact surface;
   a material supply arrangement that supplies the diffuser with material to be deposited on a wafer through the apertures;
   a rotational arrangement that rotates at least one of the wafer support and the diffuser to provide relative rotation of the diffuser with respect to the wafer support; and
   a vertical positioning arrangement for vertically positioning the diffuser and the wafer support with respect to one another such that the contact surface of the diffuser is selectively positionable against a wafer supported on the support surface.

2. The deposition tool of claim 1, wherein the material to be deposited comprises copper or a copper alloy.

3. The deposition tool of claim 2, wherein the rotational arrangement includes a rotational speed control that controls relative rotational speed of the diffuser and the wafer support.

4. The deposition tool of claim 3, wherein the relative rotational speed is between about 1 and about 100 rpm.

5. The deposition tool of claim 3, wherein the relative rotational speed is between about 5 and about 10 rpm.

6. The deposition tool of claim 5, wherein the vertical positioning arrangement includes a pressure control that presses the diffuser and the wafer support against each other with a controllable pressure.

7. The deposition tool of claim 6, wherein the controllable pressure is between about 1 and about 20 psi.

8. The deposition tool of claim 6, wherein the controllable pressure is a pressure sufficient to prevent significant deposition of the material on the substrate top surface when the material flows out of the apertures of the diffuser.

* * * * *